(12) United States Patent
Nakamura et al.

(10) Patent No.: US 6,890,621 B2
(45) Date of Patent: May 10, 2005

(54) STRETCH BLOW RECEPTACLE AND MOLDING METHOD OF THE SAME

(75) Inventors: Yutaka Nakamura, Nagano-ken (JP); Takekazu Mochizuki, Nagano-ken (JP); Isamu Yokoyama, Nagano-ken (JP); Naomichi Hinata, Nagano-ken (JP); Jin Ooishi, Nagano-ken (JP)

(73) Assignee: A.K. Technical Laboratory, Inc., Nagano-Ken (JP)

( * ) Notice: Subject to any disclaimer, the term of this patent is extended or adjusted under 35 U.S.C. 154(b) by 0 days.

(21) Appl. No.: 10/381,108

(22) PCT Filed: Sep. 27, 2001

(86) PCT No.: PCT/JP01/08468
§ 371 (c)(1),
(2), (4) Date: Mar. 19, 2003

(87) PCT Pub. No.: WO02/28619
PCT Pub. Date: Apr. 11, 2002

(65) Prior Publication Data
US 2004/0022974 A1 Feb. 5, 2004

(30) Foreign Application Priority Data
Sep. 29, 2000 (JP) ........................................ 2000-301053
Sep. 21, 2001 (JP) ........................................ 2001-289840

(51) Int. Cl.⁷ ............................. B32B 5/14; B32B 1/08; B29D 22/00; B29D 23/00
(52) U.S. Cl. ................... 428/170; 428/35.7; 428/36.91; 428/156; 428/213; 428/218; 428/220; 264/520; 264/521; 264/532
(58) Field of Search ................................ 428/35.2, 35.7, 428/36.9, 36.91, 156, 170, 212, 213, 218, 220; 264/519, 520, 521, 523, 532

(56) References Cited

U.S. PATENT DOCUMENTS 3,864,444 A * 2/1975 Johnson ........................ 264/48
5,364,585 A   11/1994 Takeuchi
6,139,934 A * 10/2000 Hettinga ..................... 428/66.3

FOREIGN PATENT DOCUMENTS

| JP | 4-214322 A | 8/1992 |
| JP | 5-131529 A | 5/1993 |
| JP | 2000-43130 A | 2/2000 |

* cited by examiner

Primary Examiner—Harold Pyon
Assistant Examiner—Michael C. Miggins
(74) Attorney, Agent, or Firm—Weingarten, Schurgin, Gagnebin & Lebovici LLP

(57) ABSTRACT

Improve the strength of the stretch blow receptacle and make the heat resistant treatment easier, by making the receptacle wall cross-section multi-layered in view of crystalline density, and the crystalline density of the surface layer high density. The inventions concerns a thin plastic receptacle 2 molded by stretch blowing of a bottomed preform 1 in the longitudinal and transversal directions. The wall cross-section is composed of inside and outside surface layers 2a whose crystalline density is high by stretching, a core layer 2b presenting a lower density than the surface layers 2a, and an intermediate layer 2c presenting a graduated density between both layers 2a, 2b.

5 Claims, 4 Drawing Sheets

STRETCH BLOW RECEPTACLE AND MOLDING METHOD OF THE SAME

FIELD OF THE INVENTION

The present invention concerns a plastic stretch blow receptacle whose main portions are molded thin, by stretching blowing of an injection molded bottom preform in the longitudinal and transversal directions.

BACKGROUND ART

Means for stretch molding of plastic receptacles for packaging such as bottles, wide-mouthed jars or the like include the cold parison method for stretch blowing a preformed bottomed preform into a receptacle by heat softening at a temperature higher than the glass transition point, and the hot parison method for immediately stretch blowing an injection molded soft and bottomed preform into a receptacle, while it maintains a potential heat higher than the glass transition point.

In the cold parison method, it is believed that the preform temperature becomes uniform and the crystalline density of the wall cross-section of the receptacle molded by stretch blowing is also uniformed, because a preform of ambient temperature is heated and softened by an external heat, allowing to obtain a receptacle easy for heat resistant treatment.

In the hot parison method, it is believed that the preform temperature tends to be uneven, because the stretch blowing should be completed while the preform is being softened by the potential heat, and the crystalline density is lower that the cold parison method, making the heat resistant treatment deficient, without any remarkable difference in strength.

The present invention devised in consideration of the aforementioned situation and has an object to provide a novel stretch blow receptacle and molding method wherein the wall cross-section is multi-layered in view of crystalline density, and the crystalline density of the surface layer is made extremely higher that the crystalline density of the interior, thereby allowing to intend to increase the strength of the receptacle and to make the heat resistant treatment easier.

DISCLOSURE OF THE INVENTION

The stretch blow receptacle of this invention according to the aforementioned object is a thin plastic receptacle molded by stretch blowing of a bottomed preform in the longitudinal direction and transversal directions, wherein the wall cross-section of the receptacle is composed of inside and outside surface layers whose crystalline density is high by stretching, a core layer presenting a lower density than the surface layers, and an intermediate layer presenting a graduated density between both layers, and the area of the core layer at the receptacle wall cross-section varies in proportion to the increase/decrease of the thickness of the wall cross-section, and the intermediate layer intervenes with a graduated crystalline density, independently of the size of the area of the core layer.

Moreover, the stretch blow receptacle of this invention is the one made of polyethylene terephthalate, the crystalline density of the surface layers is equal or superior to more or less than 1.4, the crystalline density of the core layer is lower than the surface layer as 1.32 to 1.36, and the crystalline density of the intermediate layer interposed between both layers is graduated from about 1.4 to about 1.32.

Further, the molding method of this invention is the one comprising steps of quenching a bottomed preform to or less than the orientation temperature during the injection molding; forming the wall inside and outside surfaces of the preform into a half set cover layer, in relation to the cooling temperature and time; removing the preform from the die maintaining the configuration by the half set cover layer; and thereafter stretch blow molding while the temperature at the middle of the preform is in the amorphous temperature range or in the proximity thereof, the outside surface temperature of the preform is elevating, and the half set cover layer maintains a sufficient tensile resistance, for molding into a receptacle of multi-layered structure having a wall cross-section composed of inside and outside surface layers whose crystalline density is high in respect of the crystalline density, a core layer presenting a lower density than the surface layers, and an intermediate layer interposed with a gradient crystalline density between both layers.

Moreover, it is the aforementioned molding method, wherein the preform is made of polyethylene terephthalate, the outside surface temperature of the preform is elevating and 95° to 115° C., the temperature at the wall middle is in a range of 125° to 140° C., and the preform is molded by stretch blowing, while a temperature difference of more or less than 30° C. is maintained.

BEST MODE FOR CARRYING OUT THE INVENTION

Figure 1:
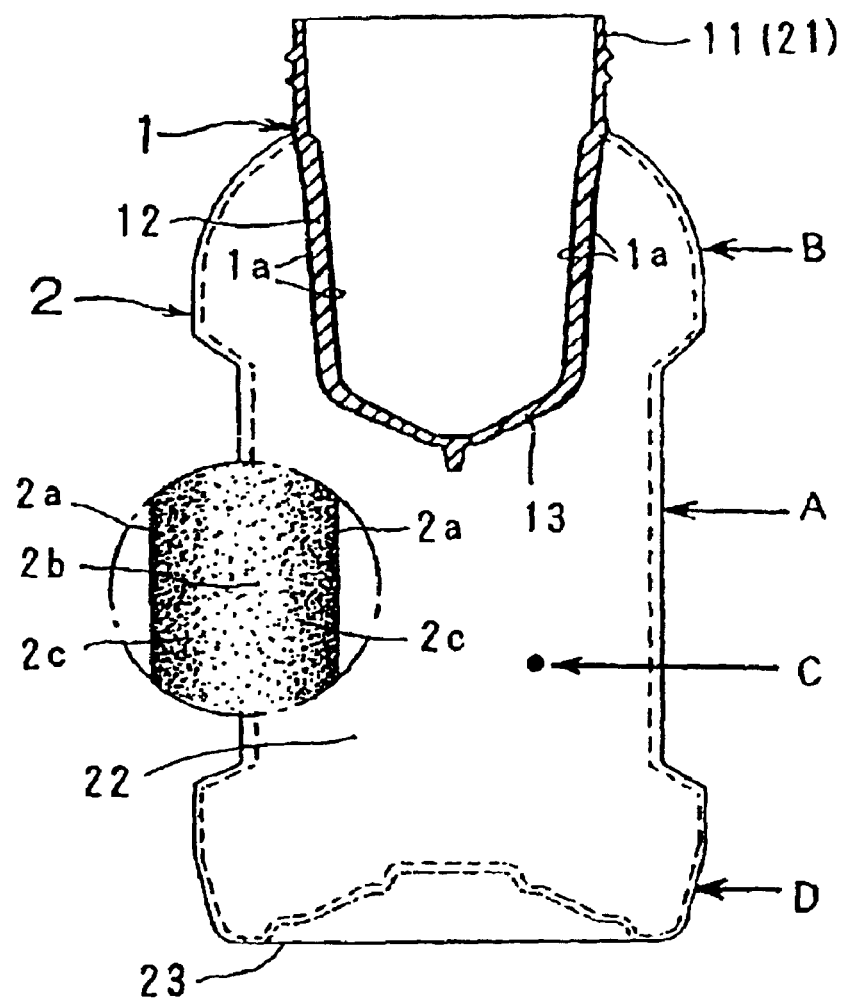
FIG. 1 an illustrative drawing showing a configuration and a partial cross-section of the stretch blow receptacle according to the present invention and a preform by a longitudinal cross-section.

In the drawing, 1 is a bottomed preform made of a thermoplastic material, for example polyethylene terephthalate, composed of a mouth 11, a body 12 extending to the same and a bottom 13, and molded by injection filling a die with molten plastic material.

A wide-mouthed receptacle 2 comprises a mouth 21 by the mouth 11 of the preform 1, a body 22 and a bottom 23 thinly stretch blown from the under side of the mouth, while the wall cross-section is composed of inside and outside surface layers 2a whose crystalline density is high, a core layer 2b presenting a lower density than the surface layers 2a, and an intermediate layer 2c presenting a graduated density between both layers 2a, 2b.

The wide-mouth receptacle 2 made of multi-layered wall cross-section in respect of the crystalline density can be manufactured by the stretch blow formation according to the hot parison method. However, it is necessary to form the inside and outside surface layers of the preform 1 into the half set cover layers 1a, 1b in relation to the cooling temperature and time by quenching the preform 1 at the temperature not more than an orientation temperature during the injection molding, in order to make the crystallite density of the inside and outside surface layers 2a high and that of the core layer 2b low.

This half set cover layer 1a is made of a skin layer generated by the contact of molten plastic with the cavity face, when the preform 1 is injection molded, and the thickness of the skin layer can be controlled in relation to the cooling temperature and time. The molten plastic flows over this skin layer and fills the cavity, and the skin layer is pulled by the flowing molten plastic increasing the thickness, there creating a flow orientation. It is supposed that this flow orientation would not be lost so long as the skin layer forms the surface of the preform 1 as half set cover layer 1a, and the crystallization degree of the surface layer 2a increases by the combination of this flow orientation with the orientation by stretch.

When the molding material is polyethylene terephthalate, it is preferable to set the cooling temperature of the die during the injection molding of the preform 1 to more or less than 15° C. In addition, it is necessary to limit the cooling within a period of time allowing to form the inside and outside surfaces of the preform 1 with the half set cover layers 1a, 1a having a temperature equal or superior to the glass transition point, and the configuration of the preform 1 can be maintained sufficiently by the half set cover layer 1a.

This cooling time is different according to the thickness of the body 11 to be blown, and the cooling time (for instance 6 to 10 sec) is set in proportion to the thickness as tendency. If the cooling time is short in comparison with the thickness, the surface half set cover layer 1a is generated thinly, and softens extremely by the potential heat within the period of time leading to the stretch blowing, making impossible to obtain a sufficient tensile resistance of the preform surface layer by the half set cover layer 1a and, on the contrary, if it is too long, the half set cover layer 1a is generated thickly more than necessary, causing problems of stretch blowing.

However, according to the configuration of the receptacle to be formed, even if the thickness of the preform is identical, a different cooling time may be set in order to preserve inside a potential heat adapted to the molding of the receptacle.

The injection molded preform 1 is removed from the die holding the mouth 11 by a well-known means, transferred immediately to the blow die in a hollow state as it is and set in the blow cavity by die compression. Then, as usual, the mouth 11 is closed by a blow core and, thereafter, the stretch blow is performed in the longitudinal direction by a middle stretch rod, and in the transversal direction by blow air, to mold into the aforementioned wide-mouth receptacle 2 wherein the mouth 11 of the preform 1 has become the mouth 21 as it is, and the body 22 is thin.

In order to obtain a wide-mouth receptacle 2 of the wall cross-section having an intermediate layer 2c, 2c presenting a gradient density between the inside and the outside surface layers 2a, 2a whose crystalline density is high and, a core layer presenting a lower density than the surface layers, by this elongation blow, it is necessary to mold by stretch blow while the temperature at the middle of the preform 1 is in the amorphous temperature range or in the proximity thereof, the outside surface temperature of the preform 1 is elevating, and at least the outside half set cover layer maintains a sufficient tensile resistance.

When the preform 1 is made of polyethylene terephthalate, it is preferable to mold the preform by stretch blowing while the outside surface temperature of the preform is elevating and 95° to 115 C.°, the temperature at the wall middle is in a range of 125° to 140☐, and a temperature difference of more or less than 30☐ is maintained there. When the surface temperature is lower than 95☐, and the temperature of the wall middle is in the range of such high temperature, the difference of crystalline density between the surface layers 2a and the core layer 2b becomes considerable, making difficult to generate an intermediate layer 2c linking both. As the result, when the body stretched thinly is pressed strongly, the outer surface layer often peels off, lowering also the buckling strength.

Moreover, when the temperature difference between the wall middle and the surface temperature becomes less that 25° C. and the temperature gradient becomes low by the radiation of inner heat along with the time elapsed after the removal from the die, the difference in crystalline density between the surface layers 2a and the core layer 2b also lowers, the density gradient between both of them, and the crystalline density also becomes averaged.

Figure 2:
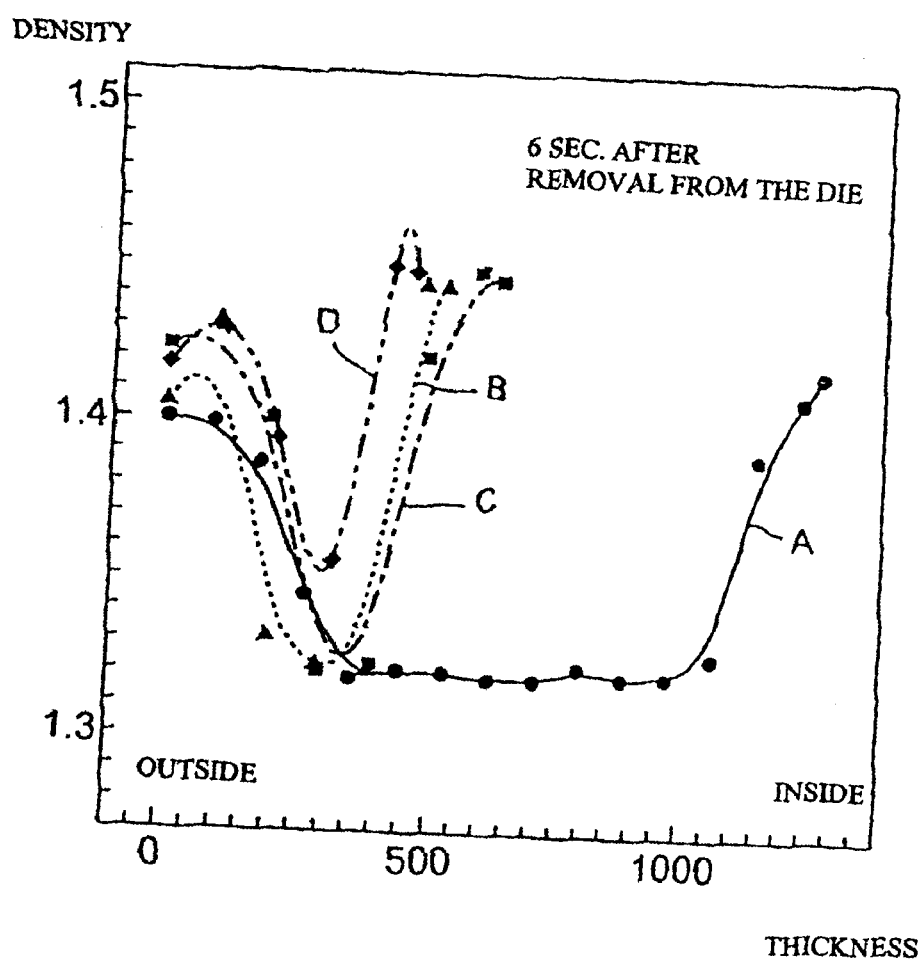
FIG. 2 a relation diagram of thickness and crystalline density at respective measurement area of the same stretch blow receptacle.

For the preform 1 of 4.4 mm in thickness formed under the molding condition of the embodiment mentioned below, the half set cover layer 1a softens unexpectedly at a high speed by the potential heat after the removal from the die. FIG. 2 shows the measurement (by Raman spectroscopy) results of the thickness and the crystalline density of a wide-mouth receptacle 2 molded by stretch blowing 6 sec after the removal from the die, at respective areas of panel A, shoulder B, body C and bottom D of the wide-mouth receptacle 2 shown in FIG. 1.

These 6 sec after the removal from the die could be called the leave time in case of the preform of 4.4 mm in thickness, and this leave time can be set in its own way, if the thickness of the wall thickness exerting a considerable influence on the potential heat changes, and it also means that the leave time can be set by controlling, through the cooling time, the degree of development of the half set cover layer 1a generated by cooling during the preform molding except for the wall thickness.

As for the wall thickness of the receptacle 2, it is 1.25 mm for the panel A where the transversal stretch rate is minimum, 0.4 mm for the bottom B where the transversal stretch rate is maximum, 0.45 mm for the shoulder B, 0.5 mm for body C, resulting in 0.65 mm for the average thickness.

Moreover, from respective curbs of crystalline density of FIG. 2, it can be understood that all portions of the surface layer 2a where the temperature is elevating are within the thickness range of about 0.2 mm, and the intermediate layer 2c presenting a gradient crystalline density intervenes with a thickness range of about 0.2 mm, and the middle portion excluding them forms the core layer 2c.

In any measurement area of the wide-mouth receptacle 2, the crystalline density high for the surface layer 2a as equal or superior to 1.4 and even the core layer 2b supposed to be in amorphous state present an crystallization of equal or superior to 1.32 in crystalline density and, from the comparison of respective measurement areas, the core layer 2b presenting a density lower than the surface layer 2a varies in proportion to the increase/decrease of the thickness of the wall cross-section; however, the aforementioned intermediate layer 2c intervenes with a gradient crystalline density within a certain range independently of the size of the core layer 2b.

The foregoing allows understand that even a receptacle whose global thickness of the receptacle is molded by stretch blow similarly to any thickness of respective area composing a part of the receptacle 2, becomes a receptacle of multi-layered structure by a crystalline density distribution similar to the respective area.

Figure 3:
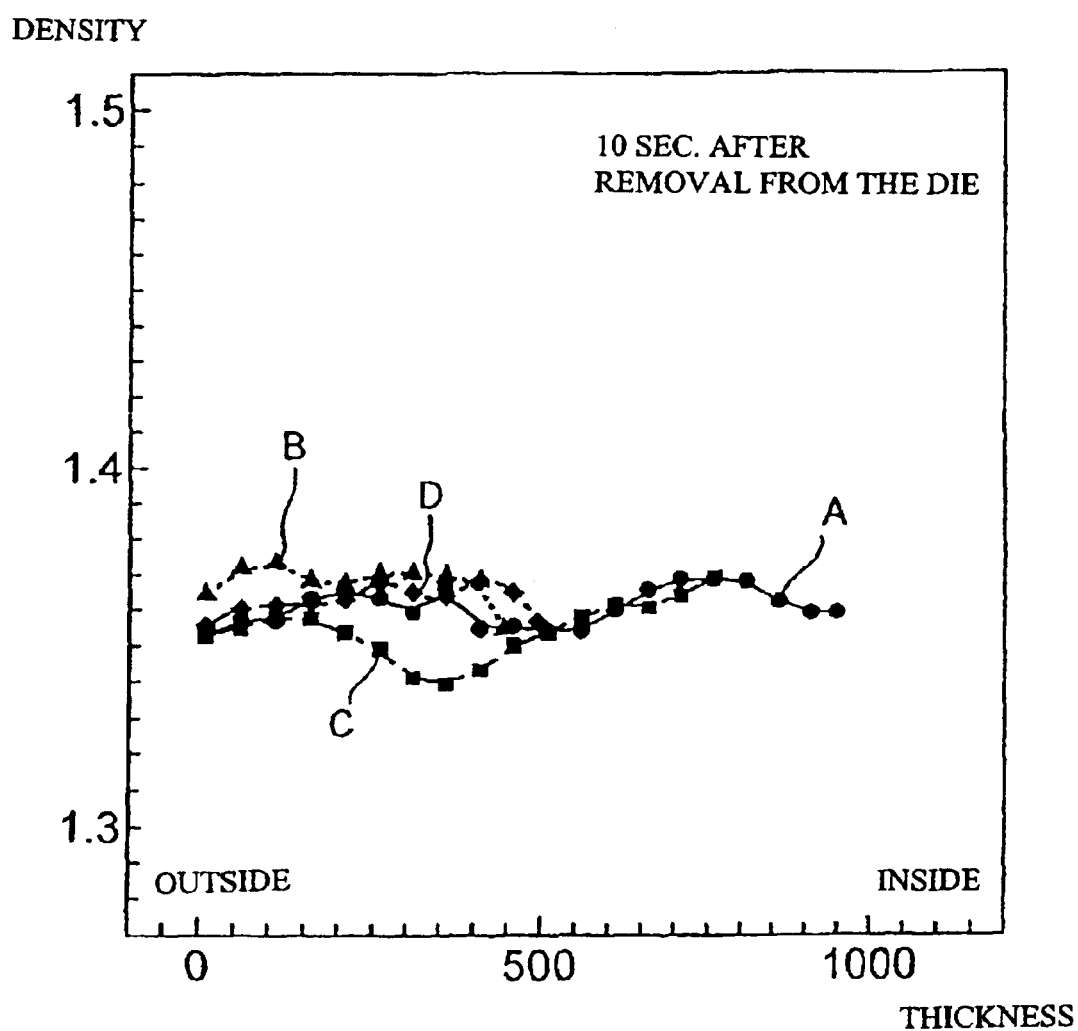
FIG. 3 a relation diagram of thickness and crystalline density of a receptacle manufacture by stretch blowing a preform per 10 sec after the removal from the die.

FIG. 3 shows, as a comparative example, the crystalline density and distribution of a receptacle 2 obtained by stretch blowing of the preform 1 about 10 sec after the removal from the die and, according to this, the crystalline density of respective measurement area appears averaged globally in a range 1.36 to 1.38, even if there is some up and down differences of a certain degree.

Figure 4:
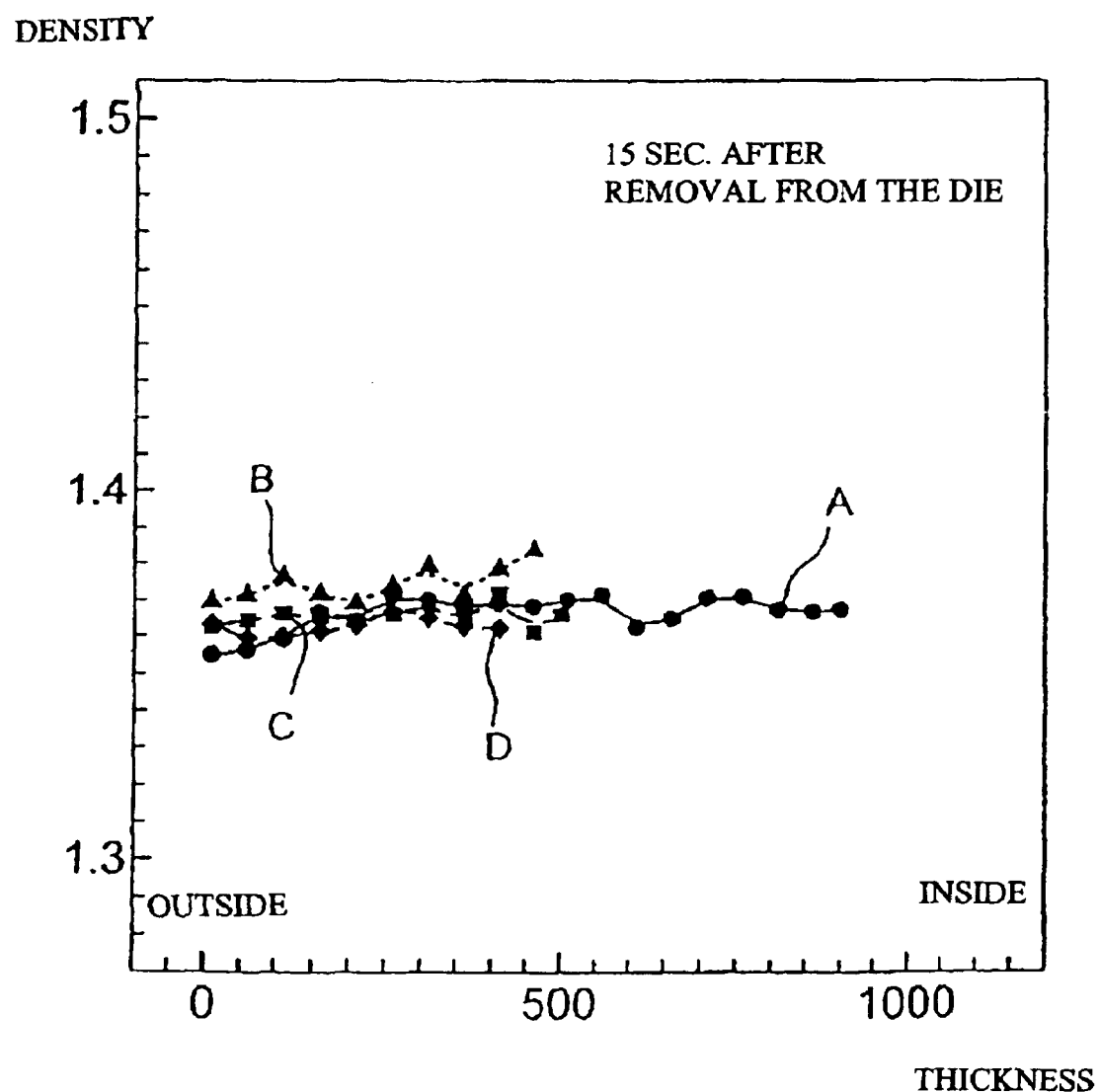
FIG. 4 a relation diagram of thickness and crystalline density of a receptacle manufacture by stretch blowing a preform per 15 sec after the removal from the die and distribution.

FIG. 4 also shows, as a comparative example, the crystalline density and distribution of a receptacle 2 obtained by stretch blowing of the preform about 15 sec after the removal from the die and, according to this, it can be understood that the crystalline density varies hardly in the stretch blow after the time when 5 more sec have elapsed, and the crystalline density of respective measurement areas are even more averaged.

It is believed that this is due to a global averaging of crystallization by stretching, as the result of lost of density difference between both surface layers 2a and the core layer 2b due to an even generation of tensile resistance during the stretch blow all over the preform, by the fact that the temperature of the preform surface layer raises by the potential heat along with the lapse of time, provoking softening, and the preform temperature is balanced as the whole, on the contrary, due to the decrease of inner temperature by radiation.

This crystalline density can be the to be a crystalline density and distribution almost equivalent to the crystalline density of a receptacle molded by stretch blowing according to the cold parison method; however, material deterioration or distortion can be generated easily, as the crystallization by a gradual cooling develops during the stretch blowing with this period of time.

Consequently, in the stretch blowing after 10 sec or more after the removal from the die, the flow orientation disappears by the softening of the half set cover layer 1a by the potential heat, and the crystallization degree by stretching reduces as the tensile resistance lowers, averaging as the whole the crystalline density of the surface layer 2a and the core layers 2b in the wide-mouth receptacle 2, and there is no more room for generating an intermediate layer 2c of graduated crystalline density between both layers.

In FIG. 2, the crystalline density of 1.4 or more of the surface layer 2a can be the extremely high density for a receptacle made of polyethylene terephthalate and becomes per se one having a heat resistance in a certain sense. However, molding distortion due to a forced stretch remains largely in such a surface layer 2a.

On the contrary, the core layer 2b of low density is formed by stretching a preform middle portion presenting a highest potential heat, being in the amorphous state, and presenting an extremely low tensile resistance, according to the stretch of the half set cover layer 1a to be the surface layer 2a of the wide-mouth receptacle 2, and is in a state where the molding distortion due to the stretch is almost absent, because the crystallization is generated by the temperature decrease by the process of this stretch.

In the receptacle having a wall cross-section of multi-layered structure wherein the intermediate layer 2c with a density gradient is interposed between the surface layer 2a and the core layer 2b presenting different crystalline densities, the fragility of the surface layer 2a against the impact force by the molding distortion is reinforced by an inner dumping of the core layers 2b subjected to no or little molding distortion and its drop strength becomes excellent, due to a still closer linkage of the both by the intervention of the intermediate layer 2c.

The heat resistance can be improved by relaxing the molding distortion of the surface layer 2a by heat treatment. This relaxation treatment can be performed by applying the blow pressure as it is for around 15 sec, without decompressing immediately after the elongation blowing, as performed usually, in a blow die set at a temperature of more or less than 116 C.°, pressure welding the molded receptacle 2 to the cavity face, and heating.

For the wall cross-section, in a structure wherein the crystalline density changes extremely suddenly from high density to low density, that area of sudden change in crystalline density tens to peel off easily; however, a wall cross-section wherein the transition from the high density of the surface layer 2a to the low density of core layer generates through the intermediate layer 2c having a graduated crystalline density peels off hardly even if it is in a multi-layered state in respect of the crystalline density. In view of the forgoing, the stretch blow receptacle according to the present invention can be the to be further improved in the strength that the conventional one, and also improved in heat resistance.

Certainly, the aforementioned embodiment concerns a wide-mouth receptacle 2, but is goes without saying that it can be applied to a narrow-mouth bottle and, therefore, the present invention is not restricted to the wide-mouth receptacle. The molding material is also not limited to polyethylene terephthalate, and it can also be applied to the other thermoplastic materials adopted as molding material of packaging receptacles.

| Embodiments | |
|---|---|
| (1) Preform | |
| Molding material polyethylene terephthalate | |
| Dimensions | |
| Mouth diameter | Ø59 mm |
| Body diameter (at the middle) | Ø56 mm |
| Length of elongated par | 63 mm |
| Wall thickness | 4.4 mm |
| (2) Molding condition (injection molding) | |
| Injection mold temperature (chiller) | 15° C. |
| Resin Temperature | 254° C. |
| Injection time | 12.0 sec |
| Cooling time | 7.0 sec |
| (3) Molding condition (stretch blow) | |
| After removal from die | 6.0 sec |
| Die temperature | 116° C. |
| Preform surface temperature | 96.2° C. |
| Blow pressure | 24 Kgf/cm2 |
| Blow time | 15.0 sec |
| Elongation rate    (longitudinal) | 2.53 times |
|                   (transversal) | 1.95 times |
| (4) Mold product (wide-mouth receptacle) | |
| Dimensions | |
| Mouth diameter | same as perform |
| Body diameter | Ø95 mm |
| Average thickness (except for mouth and bottom face portion) | 0.58 mm |
| Average density | 1.348 mm |
| Thickness and crystalline density distribution | (refer to FIG. 2) |
| Measurement method and instruments | |
| Density orientation degree measurement | Raman spectroscopy |
| JEOL: Magnetiscopic Raman Spectrum | JRS-SYSTEM2000 |

| -continued | |
|---|---|
| Temperature measurement | Ultraviolet thermograph |
| TVS-2000 Mk2 made by Nippon Aobionics Co., Ltd. | |
| Measuring method of median temperature | |
| Measure the wall cut section by thermograph | |
| Used molding machine | |
| SB3-100LL-20 made by Aokiko Institute Ltd. | |

INDUSTRIAL APPLICABILITY

In the receptacle having a wall cross-section of the multi-layered structure wherein the intermediate layer with a density gradient is interposed between the face layer and the core layer presenting different crystalline densities, the fragility of the surface layer against the impact force by the molding distortion is reinforced by an inner dumping of the core layer subjected to non or little molding distortion and its drop strength becomes excellent, due to a still closer linkage of the both by the intervention of the intermediate layer.

The heat resistance can be improved by relaxing the molding distortion of the surface layer by heat treatment. This relazation treatment can be performed by applying the blow pressure as it is for around 15 sec, without decompressing immediately after the strech blowing, as performed usually, in a blow die set at a temperature of more or less than 116° C., pressure welding the molded receptacle to the cavity face and heating.

What is claimed is:

1. A thin plastic receptacle molded by stretch blowing of a bottomed preform in the longitudinal direction and transversal direction, wherein: the wall cross-section of the receptacle is composed of inside and outside surface layers whose crystalline density is about 1.4 or greater, a core layer having a lower crystalline density than the surface layers, wherein the crystalline density of the core layer is from about 1.32 to about 1.36 and an intermediate layer having a graduated crystalline density crystalline between both layers.

2. The thin plastic receptacle of claim 1, wherein: the area of said core layer at a receptacle wall cross-section varies in proportion to an increase/decrease of the thickness of the wall cross-section, and said intermediate layer intervenes with a graduated crystalline density, independently of the size of the area of the core layer.

3. The thin plastic receptacle of claim 1, wherein: said plastic receptacle is made of polyethylene terephthalate, the crystalline density of said surface layers is about 1.4 or greater, the crystalline density of said core layer is lower than the surface layer and is about 1.32 to about 1.36, and the crystalline density of the intermediate layer interposed between both layers is graduated from about 1.4 or greater to about 1.32 to about 1.36 in the range of from about 1.4 to 1.32 to 1.36.

4. A molding method of stretch blow receptacle comprising steps of quenching a bottomed preform equal to or less than the orientation temperature during the injection molding; forming the wall inside and outside surfaces of the preform into a half set cover layer, in relation to a cooling temperature and time;

removing the preform from the die while maintaining the configuration by the half set cover layer; and thereafter stretch blow molding while the temperature at the wall middle of the preform is in an amorphous temperature range or in the proximity thereof, the outside surface temperature of the preform is elevating, and the half set cover layer maintains a sufficient tensile resistance, for molding into a receptacle of multi-layered structure having a wall cross-section composed of inside and outside surface layers whose crystalline density is about 1.4 or greater, a core layer having a lower crystalline density than the surface layers, wherein the crystalline density of the core layer is from about 1.32 to about 1.36 and an intermediate layer interposed with a gradient crystalline density between both layers.

5. The molding method of claim 4, wherein: said preform is made of polyethylenete rephthalate, the outside surface temperature of the preform is elevating and 95° to 115° C., the temperature at the wall middle is in a range of 125° to 140° C., and the preform is molded by stretch blow, while a temperature difference of more or less than 30° C. is maintained.

* * * * *

UNITED STATES PATENT AND TRADEMARK OFFICE
CERTIFICATE OF CORRECTION

PATENT NO. : 6,890,621 B2
APPLICATION NO. : 10/381108
DATED : May 10, 2005
INVENTOR(S) : Yutaka Nakamura et al.

It is certified that error appears in the above-identified patent and that said Letters Patent is hereby corrected as shown below:

Column 1, line 67, "1.4 to about 1.32" should read --1.4 or greater to about 1.32 to about 1.36--;

Column 4, line 2, "140☐" should read --140°C--;

Column 4, line 3, "30☐" should read --30°C--; and

Column 4, line 4, "95☐" should read --95°C-- .

Signed and Sealed this

Twenty-first Day of November, 2006

JON W. DUDAS
*Director of the United States Patent and Trademark Office*